(12) United States Patent
Rogner

(10) Patent No.: US 12,103,602 B2
(45) Date of Patent: Oct. 1, 2024

(54) VEHICLE HAVING AN AIR DEFLECTION ELEMENT AND METHOD FOR ADJUSTING AN AIR DEFLECTION ELEMENT ON A VEHICLE

(71) Applicant: Dr. Ing. h.c. F. Porsche Aktiengesellschaft, Stuttgart (DE)

(72) Inventor: Gert Rogner, Remchingen (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 335 days.

(21) Appl. No.: 17/686,539

(22) Filed: Mar. 4, 2022

(65) Prior Publication Data
US 2022/0281536 A1   Sep. 8, 2022

(30) Foreign Application Priority Data

Mar. 8, 2021   (DE) ..................... 10 2021 105 501.6

(51) Int. Cl.
*B62D 35/00*   (2006.01)
*B62D 37/02*   (2006.01)

(52) U.S. Cl.
CPC ........... *B62D 35/007* (2013.01); *B62D 37/02* (2013.01)

(58) Field of Classification Search
CPC ...... B62D 35/007; B62D 37/02; B62D 35/00; B62D 35/005; Y02T 10/82
See application file for complete search history.

(56) References Cited

U.S. PATENT DOCUMENTS

| 4,810,022 A * | 3/1989 | Takagi | B62D 35/005 |
| | | | 296/180.5 |
| 7,912,611 B2 | 3/2011 | Djordjevic | |
| 8,680,964 B2 | 3/2014 | Nakayama | |
| 11,208,160 B1 * | 12/2021 | Welter | B62D 35/007 |
| 2012/0326468 A1 | 12/2012 | Hutterer et al. | |
| 2014/0217508 A1 * | 8/2014 | Chang | H01L 21/845 |
| | | | 257/350 |
| 2016/0311368 A1 | 10/2016 | Lee | |
| 2017/0088192 A1 * | 3/2017 | Auden | B62D 35/007 |

(Continued)

FOREIGN PATENT DOCUMENTS

| CN | 101200198 A | 6/2008 |
| CN | 103018714 A | 4/2013 |

(Continued)

OTHER PUBLICATIONS

English Translation of DE 102019115895 A1 (Year: 2020).*

*Primary Examiner* — Lori Lyjak
(74) *Attorney, Agent, or Firm* — LEYDIG, VOIT & MAYER, LTD.

(57) ABSTRACT

A vehicle (100), having an air deflection element (102) that is able to be adjusted between a first position (102a) and a second position (102b), a drive device (104) for adjusting the air deflection element (102), and a control device (106) for controlling the drive device (104), wherein the control device (106) is coupled to an input device (108), wherein the air deflection element (102) is able to be adjusted by way of the drive device (104) by actuating the input device (108), wherein the control device (106) is coupled to an output device (110) and is designed such that the output device (110) outputs one or more acoustic signals (111) when the air deflection element (102) is adjusted.

18 Claims, 2 Drawing Sheets

(56) References Cited

U.S. PATENT DOCUMENTS

| | | | |
|---|---|---|---|
| 2018/0111650 A1* | 4/2018 | Swantick | B62D 35/005 |
| 2019/0084630 A1 | 3/2019 | Potvin et al. | |
| 2020/0165860 A1 | 5/2020 | Gempel et al. | |
| 2020/0243060 A1* | 7/2020 | Heyne | G10K 11/17823 |

FOREIGN PATENT DOCUMENTS

| | | | | |
|---|---|---|---|---|
| CN | 107031740 A | 8/2017 | | |
| CN | 207128740 U | 3/2018 | | |
| CN | 111619445 A | 9/2020 | | |
| DE | 202009002106 U1 | 5/2009 | | |
| DE | 102011077914 A1 | 12/2012 | | |
| DE | 102016202899 A1 | 4/2017 | | |
| DE | 102019115895 A1 * | 6/2020 | | B60T 1/16 |
| EP | 2648420 A1 | 10/2013 | | |
| KR | 101632148 B1 | 6/2016 | | |
| WO | WO 9426555 A1 | 11/1994 | | |

* cited by examiner ical feedback when the air deflection element is adjusted), for example to a vehicle occupant.

VEHICLE HAVING AN AIR DEFLECTION ELEMENT AND METHOD FOR ADJUSTING AN AIR DEFLECTION ELEMENT ON A VEHICLE

CROSS REFERENCE TO RELATED APPLICATIONS

This application claims benefit to German Patent Application No. DE 10 2021 105 501.6, filed on Mar. 8, 2021, which is hereby incorporated by reference herein.

FIELD

The invention relates to a vehicle having an air deflection element. The invention additionally relates to a method for adjusting an air deflection element on a vehicle.

BACKGROUND

DE 10 2011 077 914 A1 discloses an aerodynamically active apparatus for a motor vehicle having an adjustable air deflection element, a drive device for adjusting the air deflection element and a control device for controlling the drive device. The control device has an actuation device for actuating the drive device. The actuation device is able to be actuated from outside the motor vehicle.

DE 10 2016 202 899 A1 discloses a spoiler apparatus able to be retrofitted in a motor vehicle, having a front spoiler with adjustable front aerodynamic means and a rear spoiler with adjustable rear aerodynamic means. Adjustment signals for the front spoiler and rear spoiler may be transmitted by a transmitter and received by a spoiler signal receiver. A spoiler controller is able to activate the aerodynamic means on the front spoiler and rear spoiler.

SUMMARY

In an embodiment, the present disclosure provides a vehicle comprising an air deflection element configured to be adjustable between a first position and a second position, a drive device configured to adjust the air deflection element, and a control device for controlling the drive device, wherein the control device is coupled to an input device, the air deflection element is configured to be adjustable by the drive device by actuation of the input device, and the control device is coupled to an output device, the control device being configured to output one or more acoustic signals when the air deflection element is adjusted.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
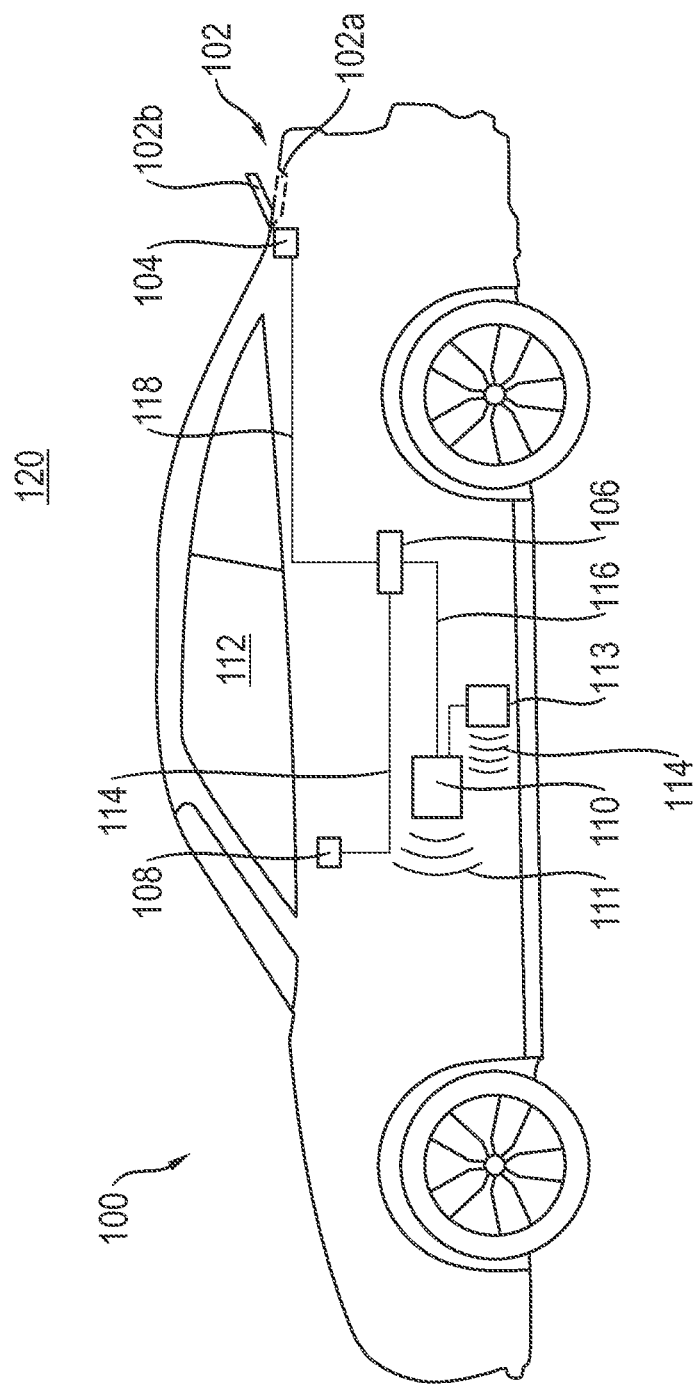
FIG. 1 shows a side view of a vehicle.

In an embodiment, a vehicle and a method that are improved in relation to adjusting an air deflection element on a vehicle are disclosed.

The vehicle, in particular motor vehicle, comprises an (aerodynamically active) air deflection element that is able to be adjusted between a first position and a second position, a drive device for adjusting the air deflection element, and a control device for controlling the drive device. The control device is coupled to an input device, wherein the air deflection element is able to be adjusted or is adjusted by way of the drive device by actuating the input device. The control device is coupled to an output device and is designed such that the output device outputs one or more acoustic signals, for example to a vehicle occupant, when for example the air deflection element is adjusted manually, that is to say when the air deflection element is adjusted in a manner initiated through actuation of the input device, for example by a vehicle occupant.

An adjustment of the air deflection element is thereby signaled acoustically. The vehicle occupant, for example a driver or a passenger, receives acoustic feedback when the air deflection element is adjusted and is thus not optically distracted, as for example in the case of a visual inspection of the air deflection element or in the case of an optical display device that optically signals an adjustment of the air deflection element. The driver is thus able to concentrate better on the road or on traffic. This increases safety. Independently of this, the driving experience may be enhanced.

The first position of the air deflection element may be a retracted position or rest position of the air deflection element. The second position of the air deflection element may be a deployed position or operating position of the air deflection element. The first position and/or the second position may each be an end position. Independently of this, the air deflection element may be arranged externally on a vehicle body of the vehicle.

The drive device for adjusting the air deflection element may be in the form of an actuator. The input device may be arranged in the vehicle interior, and may be arranged such that it is able to be actuated by a vehicle occupant (driver and/or passenger). Specifically, the input device may be in the form of an operating element, for example in the form of a hard key (knob, pushbutton, etc.), soft key or in the form of a button on a screen or touchscreen.

The one or more acoustic signals may be tones or noises. Independently of this, the one or more acoustic signals means acoustic feedback when the air deflection element is adjusted (acoustic feedback that goes beyond the mechanically induced operating noise when the air deflection element is adjusted), for example to a vehicle occupant.

The vehicle may be a motor vehicle having a manually adjustable air deflection element, such as a sports car having a manually adjustable air deflection element, for example an adjustable rear spoiler.

The input device, the drive device and/or the output device may be coupled to the control device wirelessly or in wired form, in particular electrically and/or electronically. Independently of this, the output device may be in the form of a loudspeaker, for example of a loudspeaker of a multimedia system of the vehicle.

The one or more acoustic signals may preferably be output during the adjustment of the air deflection element or upon reaching or after reaching one or more defined positions (for example first position and/or second position of the air deflection element). An acoustic signal output when the air deflection element is adjusted makes it possible to signal that the air deflection element is currently being adjusted. An acoustic signal output upon reaching or after reaching one or more positions makes it possible to signal that the corresponding position has been reached and the adjustment process is thus complete.

In each case different acoustic signals may preferably be output when the air deflection element is adjusted into the first position and when the air deflection element is adjusted into the second position. This makes it possible to acoustically distinguish between an adjustment process in one adjustment direction (for example a retraction) and an adjustment process in the other adjustment direction (for example a deployment). Different acoustic signals or signal tones (varied in terms of frequency or pitch) may be generated. It is likewise conceivable for tones to be able to be mixed with one another.

The control device may preferably be designed to activate the drive device as a result of a signal from a controller of the vehicle, as a result of which the air deflection element is able to be adjusted or is adjusted automatically by way of the drive device, wherein the output device is designed to output one or more acoustic signals when the air deflection element is adjusted automatically (that is to say adjustment as a result of a signal from the controller of the vehicle). An automatic adjustment of the air deflection element may thus also be signaled acoustically, for example to a vehicle occupant (see above). The control device may be coupled to the controller of the vehicle electrically or electronically. The signal from the controller may be output to the control device for example depending on the driving state of the vehicle (for example driving speed, transverse acceleration, etc.).

The output device may preferably be arranged and/or designed such that the one or more acoustic signals are output into the vehicle interior and/or into the surroundings of the vehicle. It is thus possible to communicate to the vehicle occupants and/or other road users that an air deflection element of the vehicle is performing an adjustment movement or has reached a defined position. The output device may optionally have a loudspeaker that is arranged in the external region of the vehicle and is able to output acoustic signals.

The air deflection element may preferably be in the form of a front spoiler, rear spoiler, diffuser, cooling air flap and/or any other aerodynamically active air deflection element. It is thus possible not only to adjust one or more corresponding air deflection elements, but also to have an acoustic signal output regarding their adjustment movement and reached positions.

The method is used to adjust an air deflection element on a vehicle. In this case, an input device is actuated (for example by a vehicle occupant), as a result of which a drive device is activated. The drive device is used to manually adjust the air deflection element between a first position and a second position. When the air deflection element is adjusted manually, that is to say when the air deflection element is adjusted in a manner initiated manually through actuation of the input device, one or more acoustic signals are output, for example to a vehicle occupant, by an output device.

The one or more acoustic signals may preferably be output during the adjustment of the air deflection element or upon reaching or after reaching one or more defined positions (for example first position and/or second position of the air deflection element). An acoustic signal output when the air deflection element is adjusted makes it possible to signal that the air deflection element is currently being adjusted. An acoustic signal output upon reaching or after reaching one or more positions makes it possible to signal that the corresponding position has been reached and the adjustment process is thus complete.

In each case different acoustic signals may preferably be output when the air deflection element is adjusted into the first position and when the air deflection element is adjusted into the second position. This makes it possible to acoustically distinguish between an adjustment process in one adjustment direction (for example retraction) and an adjustment process in the other adjustment direction (for example deployment). Different acoustic signals or signal tones (varied in terms of frequency or pitch) may be generated. It is likewise conceivable for tones to be able to be mixed with one another.

The control device may preferably activate the drive device as a result of a signal from a controller of the vehicle, as a result of which the air deflection element is adjusted automatically by way of the drive device, wherein the output device outputs one or more acoustic signals when the air deflection element is adjusted automatically (that is to say adjustment as a result of a signal from the controller of the vehicle). An automatic adjustment of the air deflection element may thus also be signaled acoustically, for example to a vehicle occupant (see above). The control device may be coupled to the controller of the vehicle electrically or electronically. The signal from the controller may be output to the control device for example depending on the driving state of the vehicle (for example driving speed, transverse acceleration, etc.).

The one or more acoustic signals may preferably be output into the vehicle interior and/or into the surroundings of the vehicle. It is thus possible to communicate to the vehicle occupants and/or other road users that an air deflection element of the vehicle is performing an adjustment movement or has reached a defined position.

The measures outlined above and/or explained below may be used with regard to the further configuration of the method.

The control device is a control apparatus for a vehicle, in particular for a motor vehicle. The control device is designed to carry out the method according to one or more of the preceding aspects.

The measures outlined above and/or explained below may be used with regard to the further configuration of the control device.

FIG. 1 schematically shows a side view of a vehicle 100, which is in the form of a sports car in the example. The vehicle 100 has an (aerodynamically active) air deflection element 102, which is in the form of a rear spoiler in the example.

The air deflection element 102 is able to be adjusted between a first position 102*a* (retracted position or rest position; shown in dashed form) and a second position 102*b* (deployed position or operating position; shown in unbroken form). Provision is also made for a drive device 104 for adjusting the air deflection element 102 and a control device 106 for controlling the drive device 104.

The control device 106 is coupled to an input device 108, wherein the air deflection element 102 is able to be adjusted or is adjusted manually by way of the drive device 104 by actuating the input device 108. The control device 106 is coupled to an output device 110 and is designed such that the output device 110 outputs one or more acoustic signals 111, for example to a vehicle occupant (not shown), when the air deflection element 102 is adjusted manually, that is to say when the air deflection element 102 is adjusted in a manner initiated manually through actuation of the input device 108.

The drive device 104 for adjusting the air deflection element 102 may be in the form of an actuator. The input device 108 is arranged in the vehicle interior 112 in the example, specifically such that it is able to be actuated by a vehicle occupant. The input device 108 may be in the form of an operating element, as described above.

The input device 108, the drive device 104 and/or the output device 110 are coupled to the control device 106 in wired form by way of lines 114, 116, 118 in the example. The output device 110 is in the form of a loudspeaker in the example.

The one or more acoustic signals 111 may be output during the adjustment of the air deflection element 102 or upon reaching or after reaching one or more defined positions (for example first position 102a and/or second position 102b of the air deflection element 102). This makes it possible to signal that the air deflection element 102 is performing an adjustment movement or this adjustment movement is complete.

In each case different acoustic signals 111 may be output when the air deflection element 102 is adjusted into the first position 102a and when the air deflection element 102 is adjusted into the second position 102b. It is thus possible to acoustically distinguish the adjustment movements from one another.

The control device 106 is designed to activate the drive device 104 as a result of a signal from a controller (not shown) of the vehicle 100, as a result of which the air deflection element 102 is able to be adjusted automatically by way of the drive device 104, wherein the output device 110 is designed to output one or more acoustic signals 111 when the air deflection element 102 is adjusted automatically.

The output device 110 is arranged and/or designed such that the one or more acoustic signals 111 are output into the vehicle interior 112 and/or into the surroundings 120 of the vehicle 100. The output device 110 may optionally have a loudspeaker 113 that is arranged in the external region of the vehicle 100 and is able to output acoustic signals (illustrated by sound waves 114).

Figure 2:
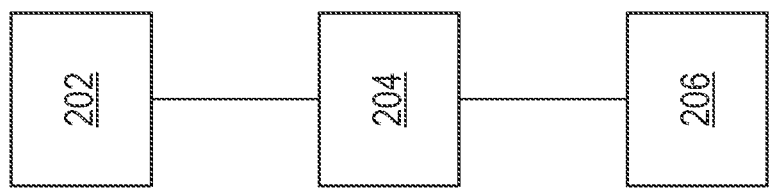
FIG. 2 shows a sequence of the method for adjusting an air deflection element.

FIG. 2 schematically shows a sequence of the method 200 for adjusting an air deflection element 102 of a vehicle 100.

The method 200 is used to adjust the air deflection element 102 on the vehicle 100. In this case, an input device 108 is actuated, for example by a vehicle occupant (not shown), as a result of which a drive device 104 is activated (step 202).

The drive device 104 is used to manually adjust the air deflection element 102 between a first position 102a and a second position 102b (step 204). When the air deflection element 102 is adjusted manually, that is to say when the air deflection element 102 is adjusted in a manner initiated manually through actuation of the input device 108, one or more acoustic signals 111 are output, for example to a vehicle occupant, by an output device 110 (step 206).

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A vehicle, comprising:
   an air deflection element configured to be adjustable between a first position and a second position;
   a drive device configured to adjust the air deflection element; and
   a control device for controlling the drive device, wherein:
   the control device is coupled to an input device,
   the air deflection element is configured to be adjustable by the drive device by actuation of the input device, and
   the control device is coupled to an output device, the control device being configured to output one or more acoustic signals when the air deflection element is adjusted
   wherein the one or more acoustic signals are output during the adjustment of the air deflection element.

2. The vehicle as claimed in claim 1, wherein the one or more acoustic signals are output upon reaching or after reaching one or more defined positions of the air deflection element.

3. The vehicle as claimed in claim 1, wherein the control device is configured to activate the drive device upon receiving a signal from a controller of the vehicle, as a result of which the air deflection element is adjusted automatically by the drive device, and wherein the output device is configured to output the one or more acoustic signals when the air deflection element is adjusted automatically.

4. The vehicle as claimed in claim 1, wherein the output device is configured such that the one or more acoustic signals are output into the vehicle interior and/or into the surroundings of the vehicle.

5. The vehicle as claimed in claim 1, wherein the air deflection element is in the form of a front spoiler, rear spoiler, diffuser, cooling air flap and/or any other aerodynamically active air deflection element.

6. A method for adjusting an air deflection element on a vehicle, comprising:
   actuating an input device, as a result of which a drive device is activated so as to adjust the air deflection element between a first position and a second position, wherein one or more acoustic signals are output by an output device when the air deflection element is adjusted,
   wherein the one or more acoustic signals are output during the adjustment of the air deflection element.

7. The method as claimed in claim 6, wherein the one or more acoustic signals are output upon reaching or after reaching one or more defined positions of the air deflection element.

8. The method as claimed in claim 6, wherein the control device activates the drive device as a result of a signal from a controller of the vehicle, as a result of which the air deflection element is adjusted automatically by way of the drive device, and wherein the output device outputs one or more acoustic signals when the air deflection element is adjusted automatically.

9. The method as claimed in claim 6, further comprising outputting the one or more acoustic signals into the vehicle interior and/or into the surroundings of the vehicle.

10. A control device for a vehicle, wherein the control device is designed to carry out the method as claimed in claim 6.

11. The vehicle as claimed in claim 2, wherein different acoustic signals are output when the air deflection element is adjusted into a first position than when the air deflection element is adjusted into a second position.

12. The method as claimed in claim 7, wherein different acoustic signals are output when the air deflection element is adjusted into the first position than when the air deflection element is adjusted into the second position.

13. The vehicle as claimed in claim 1, wherein the acoustic signal output during the adjustment of the air deflection element toward a first position differs from the acoustic signal output during the adjustment of the air deflection element toward a second position.

14. The method as claimed in claim 1, wherein the acoustic signal output is during the entire adjustment period of the air deflection element.

15. The vehicle as claimed in claim 5, wherein the front spoiler, rear spoiler, diffuser, cooling air flap and/or other aerodynamically active air deflection element is configured to be deployed toward a deployment position and retracted toward a retraction position, wherein the one or more acoustic signals are output during the deployment and/or retraction.

16. The method as claimed in claim 6, wherein the air deflection element is in the form of a front spoiler, rear spoiler, diffuser, cooling air flap and/or other aerodynamically active air deflection element and configured to be deployed toward a deployment position and retracted toward a retraction position, wherein the one or more acoustic signals are output during the deployment and/or retraction.

17. The vehicle as claimed in claim 3, wherein the controller sends the signal upon an automatic detection of a driving state of the vehicle.

18. The vehicle as claimed in claim 15, wherein the retraction position is configured to conceal the front spoiler, rear spoiler, diffuser, cooling air flap and/or other aerodynamically active air deflection element from view and/or aerodynamic effect.

* * * * *